United States Patent [19]

Kawai

[11] Patent Number: 4,939,760
[45] Date of Patent: Jul. 3, 1990

[54] APPARATUS FOR PROCESSING AN X-RAY IMAGE
[75] Inventor: Masumi Kawai, Kyoto, Japan
[73] Assignee: Shimadzu Corporation, Kyoto, Japan
[21] Appl. No.: 292,073
[22] Filed: Dec. 30, 1988
[30] Foreign Application Priority Data Feb. 29, 1988 [JP] Japan .................................. 63-48209

[51] Int. Cl.⁵ .............................................. H05G 1/64
[52] U.S. Cl. ....................................... 378/99; 358/111
[58] Field of Search ........................... 378/99; 358/111
[56] References Cited

U.S. PATENT DOCUMENTS 4,193,089 3/1980 Brougham et al. ................. 358/111
4,463,375 7/1984 Macovski .............................. 378/99
4,663,773 5/1987 Haendle et al. ....................... 378/99

Primary Examiner—Craig E. Church
Attorney, Agent, or Firm—Griffin, Branigan & Butler

[57] ABSTRACT

An apparatus for processing X-ray images includes a smoothing circuit consisting of a low-pass filter. When a pre-contrast image passes therethrough, the higher portion of the spatial frequency of the pre-contrast image is cut off. A contrast image consists of a vascular image added to the pre-contrast image. The subtration of the smoothed pre-contrast image from the contrast image is carried out in a subtraction circuit. An image outputted from the subtraction circuit consists solely of the vascular image and the marginal images of skeletons, etc. This image permits easy ascertainment of vascularity on the surfaces of skeletons, etc.

1 Claim, 1 Drawing Sheet

APPARATUS FOR PROCESSING AN X-RAY IMAGE

BACKGROUND OF THE INVENTION

The present invention relates to an apparatus for processing an X-ray image, and more particularly to what is called an apparatus for digital subtraction angiography (DSA), in which video signals representing an X-ray fluoroscopic image obtained from an X-ray television system are digitalized and subjected to subtraction processing so as to obtain a vascular image.

There are some cases where X-ray images, such as contrast images obtained from an apparatus for DSA or vascular images obtained by subjecting the above-mentioned contrast images to contrast enhancement, are used as orientation images in surgical operations, etc. These contrast images and vascular images are characterized by a very large dynamic range, including the images of soft tissues where X-ray absorption is low and the images of skeletons where X-ray absorption is high. In order to ascertain vascularity on the surfaces of skeletons, etc., surgeons make an observation of low-density vascular images set off against the contrast images.

Vascular images are formed by contrast media, the X-ray absorption of which is lower than that of skeletons. Consequently the density of the vascular images is lower than that of the skeletal images, and vascularity is not easily ascertained.

SUMMARY OF THE INVENTION

It is an object of the present invention to provide such an apparatus for processing an X-ray image as to be suitable for delivering an orientation image which permits easy ascertainment of vascularity in surgical operations, etc.

For the accomplishment of the above-described object, the apparatus for processing an X-ray image in accordance with the present invention comprises a smoothing means for smoothing an X-ray image obtained before the injection of a contrast medium and a subtraction means for carrying out subtraction between the X-ray image thus smoothed and an X-ray image obtained after the injection of a contrast medium.

A pre-contrast image i.e. an X-ray image obtained before the injection of a contrast medium, is blurred when it is smoothed. This blurred appearance is caused by the removal of the higher portion of the spatial frequency.

A contrat image, i.e. an X-ray image obtained after the injection of a contrast medium, consists of a vascular image added to the pre-contrast image. When viewed from the standpoint of spatial frequencies, the contrast image is an image formed by adding the high spatial frequency of the vascular image to the spatial frequency of the pre-contrast image.

The subtraction of the blurred pre-contrast image from the contrast image results in removing the lower portion of the spatial frequency from the contrast image. The result is that, although the vascular image remains almost intact, the images of skeletons and soft tissues, which were also originally included in the contrast image, are reduced to contour lines. Thus an image consisting solely of the vascular image and the marginal images of skeletons and soft tissues is obtained. This image permits the very easy ascertainment of vascularity on the surfaces of skeletons, etc. and thereby makes itself suitable for being used as an orientation image in surgical operations, etc.

A preferred embodiment of the present invention is hereinafter described with reference to the accompanying drawings.

DETAILED DESCRIPTION OF THE INVENTION

Figure 1:
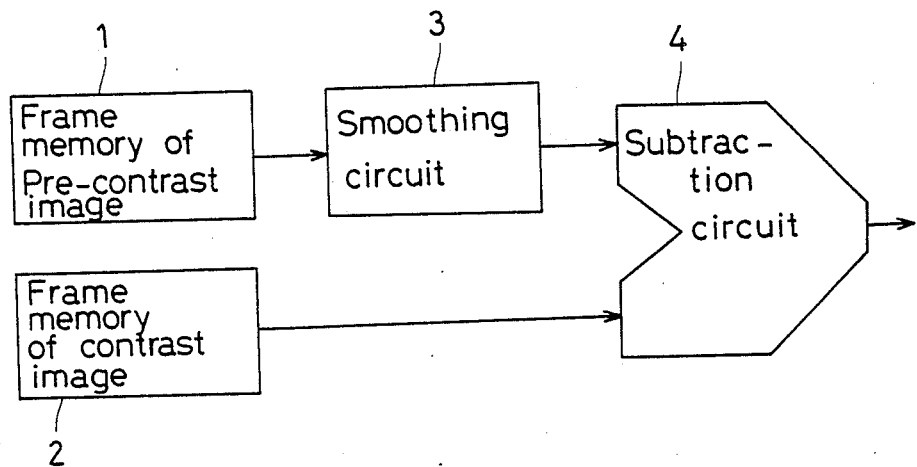
FIG. 1 is a block diagram of an embodiment of the present invention.

Referring now to FIG. 1, a pre-contrast image, i.e an X-ray image obtained before the injection of a contrast medium, has already been stored in a frame memory 1, while a contrast image, i.e. an X-ray image obtained after the injection of a contrast medium, has already been stored in a frame memory 2. The readout from the frame memory 1 is fed to a smoothing circuit 3 and smoothed therein and further fed to a subtraction circuit 4, while the readout from the frame memory 2 is directly fed to the subtraction circuit 4, in which a subtraction between these two readouts is carried out.

Figure 2A:
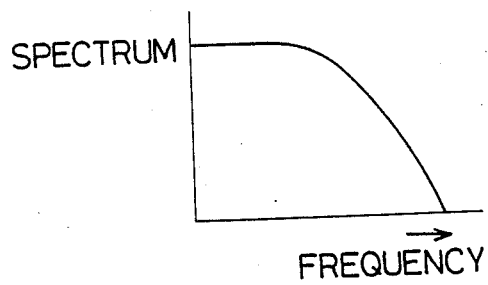
FIG. 2A to 2E are spectrograms to help explain the operation thereof.
Figure 2D:
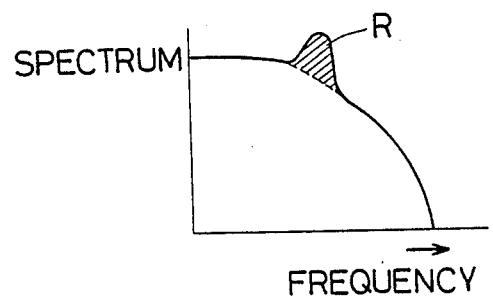
Figure 2B:
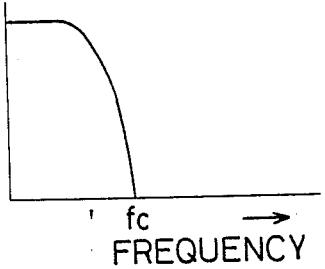

Let it be supposed that a pre-contrast image has such a spatial frequency spectrum as shown in FIG. 2A and that the smoothing circuit 3 consists of a low-pass filter which cuts off the spatial frequency portion higher than f cycles as shown in FIG. 2B. When the pre-contrast image passes through this smoothing circuit 3, the frequency characteristic of the pre-contrast image undergoes a change and comes to be represented by a characteristic curve shown in FIG. 2C. Thus the higher portion of the spatial frequency is cut off, and the image now consists merely of the lower portion thereof, with the result that the marginal portion of the image is rendered vague and blurred.

A contrast image consists of a vascular image added to the pre-contrast image. Therefore, the frequency spectrum of a contrast image consists, as shown in FIG. 2D, of the frequency R of a vascular image added to the frequency characteristic shown in FIG. 2A.

Figure 2E:
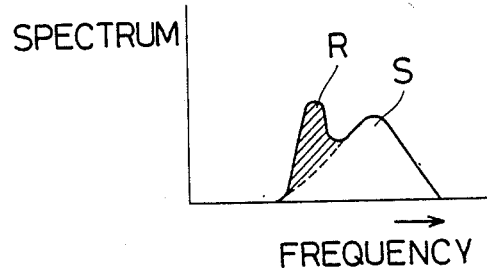
Figure 2C:
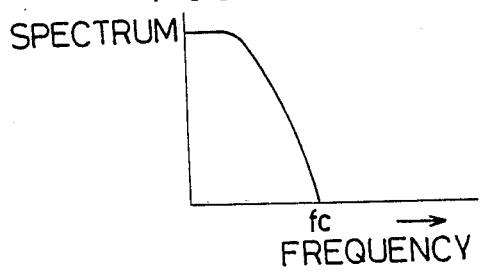

When viewed from the standpoint of spatial frequencies, the subtraction of the blurred pre-contrast image from the contrast image is represented by the subtraction of the curve shown in FIG. 2C from the curve shown in FIG. 2D. The result of this substraction is shown in FIG. 2E. The frequency characteristic of an image shown in FIG. 2E is such that this image consists merely of the higher portion of the spatial frequency. The vascular image is represented by a portion R provided with oblique hatching, while a portion S represents the margins of skeletons and soft tissues, the images of which were included in the contrast image (and also in the pre-contrast image before it was smoothed). Consequently an image outputted from the subtraction circuit 4 consists solely of the vascular image and the marginal images of skeletons and soft tissues. This image permits the very easy ascertainment of vascularity on the surfaces of skeletons, etc.

By changing the cut-off frequency of the smoothing circuit 3, it is possible to adjust the degree in which a pre-contrast image is smoothed or blurred and thereby adjust the amount of information about the margins of skeletons, etc.

Although a pre-contrast image and a contrast image are stored in frame memories 1 and 2 respectively in the above-described embodiment, a pre-contrast image and a subtraction image may be stored therein. In the latter case, the contrast image is reproduced by adding the pre-contrast image to the subtraction image, and is subjected to the same processing as mentioned above.

From the foregoing, it will be apparent that an image consisting solely of the vascular image and the marginal images of skeletons and soft tissues is obtained from the apparatus in accordance with the present invention. This image is very suitable as an orientation image in surgical operations, etc. because, by making an observation of this image, one can very easily ascertain vascularity on the surfaces of skeletons, etc.

I claim:

1. An apparatus for processing an X-ray image said apparatus comprising:
   memory means for storing an X-ray image obtained before the injection of a contrast medium;
   a subtraction means;
   smoothing means responsive to said memory means for smoothing said X-ray image obtained before the injection of a contrast medium, and applying it to said subtraction means; and,
   means for applying said X-ray image obtained after the injection of a contrast medium to said subtraction means simultaneously with the application of said smoothed X-ray image thereto.

* * * * *